(12) United States Patent
Schechter

(10) Patent No.: US 8,046,984 B1
(45) Date of Patent: Nov. 1, 2011

(54) AIRLESS GAS-TURBINE ENGINE

(76) Inventor: Michael Moses Schechter, Farmington Hills, MI (US)

( * ) Notice: Subject to any disclaimer, the term of this patent is extended or adjusted under 35 U.S.C. 154(b) by 0 days.

(21) Appl. No.: 13/066,435

(22) Filed: Apr. 15, 2011

Related U.S. Application Data

(62) Division of application No. 12/460,881, filed on Jul. 27, 2009, now Pat. No. 7,954,478.

(51) Int. Cl.
*F02C 9/18* (2006.01)

(52) U.S. Cl. ........................... 60/39.27; 60/39.23

(58) Field of Classification Search ............... 123/567, 123/585–588, 568.11, 568.12; 60/793, 794, 60/39.23, 39.24, 39.27, 39.52
See application file for complete search history.

(56) References Cited

U.S. PATENT DOCUMENTS

| | | | |
|---|---|---|---|
| 2,960,834 A * | 11/1960 | Kirk Patrick | 62/50.2 |
| 3,861,367 A | 1/1975 | Kelmar | |
| 4,238,925 A * | 12/1980 | Lowther | 60/39.461 |
| 5,649,517 A | 7/1997 | Poola et al. | |
| 5,782,081 A * | 7/1998 | Pak et al. | 60/39.181 |
| 5,960,777 A | 10/1999 | Nemser et al. | |
| 6,055,808 A | 5/2000 | Poola et al. | |
| 6,067,973 A | 5/2000 | Chanda et al. | |
| 6,212,871 B1 * | 4/2001 | Rakhmailov | 60/773 |
| 6,352,068 B1 | 3/2002 | Jacobsen | |
| 6,397,807 B1 | 6/2002 | Suzuki | |
| 6,945,052 B2 * | 9/2005 | Frutschi et al. | 60/772 |
| 7,124,591 B2 * | 10/2006 | Baer et al. | 60/786 |
| 7,290,403 B2 * | 11/2007 | Peyron | 62/656 |
| 7,543,577 B2 | 6/2009 | Ha et al. | |
| 7,861,511 B2 * | 1/2011 | Chillar et al. | 60/39.52 |
| 2007/0251235 A1 * | 11/2007 | Schmid et al. | 60/605.2 |
| 2009/0151315 A1 * | 6/2009 | Kamohara et al. | 60/39.24 |
| 2010/0180565 A1 * | 7/2010 | Draper | 60/39.52 |
| 2011/0107736 A1 * | 5/2011 | Chillar et al. | 60/39.52 |
| 2011/0138766 A1 * | 6/2011 | ELKady et al. | 60/39.24 |

* cited by examiner

*Primary Examiner* — Stephen K Cronin
*Assistant Examiner* — Arnold Castro

(57) ABSTRACT

A gas-turbine engine receives no air from outside atmosphere. Instead, combustion gas expelled from the engine is cooled and recycled back into the engine. That gas contains no nitrogen and consists mostly of carbon dioxide and water vapor. Oxygen and fuel are added to the recycled gas, and the resulting mixture is used to perform an internal-combustion process. A small amount of the expelled combustion gas is discharged into outside environment, and the rest is recycled. Since no nitrogen is present, no nitrogen oxides are produced. The amount of other harmful exhaust emissions, including particulate matter, is greatly reduced too, since most of them are recycled back into the engine. The engine is inherently supercharged with controllable combustion-gas pressure and, in some cases, can operate without a compressor. Since the combustion gas is heavier than air, the engine can be substantially smaller than a conventional engine of equal power. Complete elimination of nitrogen oxide emissions and a significant reduction in particulate matter can substantially increase appeal of gas-turbine engines based on the above concept.

7 Claims, 3 Drawing Sheets

AIRLESS GAS-TURBINE ENGINE

CROSS-REFERENCE TO RELATED APPLICATIONS

This is a division of application Ser. No. 12/460,881, filed Jul. 27, 2009 now U.S. Pat. No. 7,954,478.

FEDERALLY SPONSORED RESEARCH

Not Applicable

SEQUENCE LISTING OR PROGRAM

Not Applicable

FIELD OF THE INVENTION

The present invention relates to gas-turbine engines, in which gas produced in combustion is recycled back to the engine inlet. It also relates to gas-turbine engines, in which oxygen is added to gas flowing into the engine.

BACKGROUND OF THE INVENTION

Gas-turbine engines offer good fuel economy and high power-to-weight ratio. They are, however, prodigious producers of nitrogen oxides, which are considered to be some of the most harmful air pollutants. Controlling nitrogen oxides emission is very difficult and very expensive. Another drawback is emission of particulate matter and unburned hydrocarbons, which is very harmful to human health. In view of the above, it is clear that it is highly desirable to have a system and a method of gas-turbine engine operation that eliminates the above disadvantages while retaining the fuel economy advantage. Such a system and a method are the subject of the present invention.

PRIOR ART

Recycling some of the engine exhaust gas back into the engine intake is not new. Many modern internal-combustion engines incorporate an exhaust gas recirculation (EGR) system that provides for adding a small amount of exhaust gas (10-15%, in most cases) to the engine intake air. This reduces the peak combustion temperature that contributes to formation of nitrogen oxides in the combustion chamber. EGR cannot eliminate the nitrogen oxide emission, but it can reduce it.

The method of the present invention does not involve adding exhaust gas to the intake air. The engine of the present invention inducts no air from outside atmosphere. Instead, combustion gas is recycled from the engine outlet back into the engine inlet and, when oxygen is added to it, forms a kind of "artificial air" that contains no nitrogen. That "artificial air" is used instead of atmospheric air to burn fuel in the engine. Since there is no nitrogen, no nitrogen oxides can form, regardless of the temperature. The engine of the present invention has zero nitrogen oxides emission.

Adding oxygen to the engine intake is also known. A U.S. Pat. No. 7,543,577 to Ha, et al describes a system, in which an internal-combustion engine is supplied with a mixture of oxygen and fuel. The system inducts atmospheric air and runs it through a PSA (pressure swing adsorption) system, where most of the nitrogen is removed and exhausted into outside environment. The remaining gas, which contains about 95% oxygen and 5% nitrogen, is mixed with fuel and fed into the engine combustion chamber. An option to induct atmospheric air and add it to the mixture is also provided. There is no recycling of combustion gas.

Operating an engine with a mixture of fuel and oxygen presents some technical difficulties. In a conventional internal-combustion engine, fuel is mixed with air containing 23% of oxygen (by weight), which takes part in combustion, and 77% of nitrogen and argon, which does not take part in combustion. Presence of a substantial amount of inert gas (nitrogen) is important, because it maintains the temperature in the combustion chamber within an acceptable level.

When fuel is burned in air, the chemically correct ratio of air to fuel is about 14.8:1, and the oxygen-to-fuel ratio is about 3.4:1. The peak combustion temperature may reach 2200 degrees Celsius, which is almost 4000 degrees Fahrenheit. The above patent does not specify what oxygen-to-fuel ratio is used, but using the chemically correct ratio (3.4:1) is out of the question, because the mass of gas would be almost four times less than it is in the case when air is used, but the amount of heat is still the same. As a result, the temperature (and the pressure) would be several times higher and would reach levels that are completely unacceptable from the point of view of the engine integrity and durability.

To maintain an acceptable level of temperature in the engine of the above patent, the oxygen-to-fuel ratio would have to be much higher than the chemically correct ratio (3.4:1). In fact, it would have to be close to the value of the air-to-fuel ratio in a conventional engine (14.8:1). The extra oxygen would serve as inert gas that absorbs the heat, and the exhaust gas will contain large amount of unused oxygen. The main disadvantage of this is that, to produce the needed amount of oxygen, the system of the above patent must handle more than four times greater amount of air than does a conventional engine that uses air directly for combustion.

Ha, et al must be fully aware of the above difficulties, since the above patent also includes means "for supplying external air to the engine when the oxygen is insufficient in the process of combustion". When atmospheric air is added to the oxygen flowing into the combustion chamber, the engine of the above patent turns into an engine running on oxygen-enriched air, like in some of the patents referred to below.

Ha, et al expect the engine of the above patent to produce less nitrogen oxides, because less nitrogen (about 5%) is available to react with oxygen. However, for the tiny amount of nitrogen oxides that form during combustion, even 5% provides a rich supply of nitrogen, if sufficient supply of oxygen is available. It is an open question if abundance of oxygen molecules chasing a scarcity of nitrogen molecules, as in the above patent, is better than an abundance of nitrogen molecules chasing a scarcity of oxygen molecules, as in a conventional engine. Regardless of the answer to that question, the system of the above patent does not eliminate the nitrogen oxide emission, because it does not eliminate nitrogen.

Ha, et al also expect carbon monoxide and unburned hydrocarbon emissions to be reduced due to abundance of oxygen in the engine of the above patent. Without question, carbon monoxide will be reduced. Reduction in unburned hydrocarbons is possible, but it is more questionable. Unburned hydrocarbons form in small crevices between the piston and the cylinder, where the flame cannot penetrate. If there is no flame, hydrocarbons don't burn, regardless of how much oxygen is available.

In contrast to the above patent, the system of the present invention does not have to induct a huge amount of air and exhaust a huge amount of nitrogen to produce a sufficient amount of oxygen for burning the fuel and for serving as an inert diluting gas. Nor does it have to add atmospheric air to serve as diluting gas. The engine of the present invention receives no air from outside atmosphere. Instead, combustion gas expelled from the engine is cooled and repeatedly recycled back into the engine. That gas contains no nitrogen and consists mostly of carbon dioxide and water vapor. Oxygen and fuel are added to the recycled gas, and the resulting mixture is used to perform an internal-combustion process. Only a small amount of the expelled combustion gas is discharged into outside environment, and the rest is recycled again. Since no nitrogen is present, no nitrogen oxides are produced. The engine of the present invention is a true zero nitrogen oxides emission engine.

In the engine of the present invention, the amount of other harmful exhaust emissions, including particulate matter, unburned hydrocarbons and carbon monoxide, is greatly reduced, but the reason for this has very little to do with the relative abundance or scarcity of oxygen in the combustion chamber. The key to reduction in those emissions is in repeatedly subjecting the same gas to the fires of combustion in the engine. Since most of the combustion gas is recycled back into the combustor over-and-over again, an average particle of gas goes through the combustion process many times before it is discharged into outside environment. It is not likely that a particle of unburned hydrocarbon that formed in a small crevice, where the flame could not penetrate, would find itself in such crevice again when it visits the combustion chamber again. In such operation, whatever did not burn the first time is repeatedly returned to the combustor and is burned there.

In a U.S. Pat. No. 6,397,807 to Suzuki, oxygen is added to the intake air for a different reason. The above patent addresses the difficulties with the cold start of internal combustion engine. The system of the above patent includes a separate combustion heater, in which fuel can be burned separately from the engine. Hot combustion gas, produced in the heater, flows into the engine intake system, where it is added to the intake air. This takes place at the engine starting time or before the engine starting time, when the engine does not even rotate. The temperature of the intake air is raised by the high temperature of the combustion gas from the heater, thereby speeding up the warm-up of the engine. The heater also heats up the engine cooling water.

In the engine of the above patent, addition of combustion gas from the heater to the engine intake air reduces the amount of oxygen available for combustion in the engine during the start-up. To compensate for oxygen deficiency, oxygen is added from an oxygen supply apparatus to the intake air or to the combustion gas. After the engine warms up, regular operation with atmospheric air resumes. The above patent claims only improvements in engine cold-start capability.

A number of other patents claim a reduction in nitrogen oxides emission and some other advantages by producing and feeding into the engine oxygen-enriched or nitrogen-reduced air. Such are:

U.S. Pat. No. 6,352,068 to Jacobson.
U.S. Pat. No. 6,067,973 to Chanda, et al.
U.S. Pat. No. 6,055,808 to Poola, et al.
U.S. Pat. No. 5,960,777 to Nemser, et al.
U.S. Pat. No. 5,649,517 to Poola, et al.

None of the above patents claims complete elimination of nitrogen oxides, since none of them achieves complete elimination of nitrogen from the engine, as the present invention does. None of the engines in the above reviewed patents is capable of self-supercharging.

A U.S. Pat. No. 3,861,367 to Kelmar describes a piston-type internal-combustion engine that recycles 40% of exhaust gas and has no air intake. It claims elimination of nitrogen oxides. However, the system of the above patent has no gas-cooling means for controlling the recycled gas temperature, and no pressure-control means for controllably varying the recycled gas pressure in accordance with a control program incorporated in control system. The engine of the above patent is not capable of self-supercharging.

OBJECTS AND ADVANTAGES

One object of the present invention is to achieve a complete elimination of nitrogen oxides emissions from gas-turbine engines. This is achieved by eliminating nitrogen. Since no air is inducted into the engine, no nitrogen takes part in the combustion process. The combustion gas recycled back into the engine consists mostly of carbon dioxide and water vapor. Since no nitrogen is present, no nitrogen oxides are produced. This removes one of the most significant deficiencies of gas-turbine engines, which, in their conventional incarnations, are prodigious producers of nitrogen oxides.

Another object of the present invention is to achieve a drastic reduction in the amount of particular matter and unburned hydrocarbons emitted by gas-turbine engines. Recycling of combustion gas deals with that problem very effectively. Since most of the combustion gas is recycled back into the combustor over-and-over again, an average particle of gas goes through the combustion process many times before it is discharged into outside environment. In such operation, most of the particulate matter and unburned hydrocarbons is repeatedly returned to the combustor and is burned there.

A further object of the present invention is to reduce the size of gas-turbine engines. The engine of the present invention can be considerably smaller than a conventional air-breathing engine with the same power capacity. This is because carbon dioxide, which is the main ingredient in the recycled combustion gas of the airless engine, is much heavier than nitrogen, which is the main ingredient in the intake air of a conventional air-breathing engine. Therefore, a smaller engine can handle the same mass of gas as a larger engine using air at the same pressure and temperature.

A further object of the present invention is to improve the fuel economy of gas-turbine engines. The engine of the present invention is capable of self-supercharging, which permits deactivation of the compressor. Elimination of the work needed to drive the compressor reduces the engine fuel consumption.

Yet another object of the present invention is to reduce the cost of gas-turbine engines. Elimination of nitrogen oxides emission eliminates the need for an expensive nitrogen oxides emission control system. Substantial reduction in particulates and other harmful exhaust emissions leads to much smaller and cheaper filters and catalysts.

SUMMARY

A gas-turbine engine receives no air from outside atmosphere. Instead, combustion gas expelled from the engine is cooled and recycled back into the engine. Oxygen and fuel are added to the recycled gas, and the resulting mixture is used to perform an internal-combustion process. A small amount of the expelled combustion gas is discharged through a pressure-control valve into outside environment, and the rest is recycled.

Since no air is inducted into the engine, no nitrogen takes part in the combustion process. The combustion gas recycled back into the engine consists mostly of carbon dioxide and water vapor. Since no nitrogen is present, no nitrogen oxides are produced. This removes one of the most significant deficiencies of gas-turbine engines, which, in their conventional incarnations, are prodigious producers of nitrogen oxides.

Another drawback of gas turbines is particulate matter and other harmful exhaust emission, and this is greatly reduced too. Since most of the combustion gas is recycled back into the combustor over-and-over again, an average particle of gas goes through the combustion process many times before it is discharged into outside environment. In such operation, most of the particulate matter and other emissions are repeatedly returned to the combustor and are burned there.

The engine of the present invention can be considerably smaller than a conventional air-breathing engine with the same power capacity. This is because carbon dioxide, which is the main ingredient in the recycled combustion gas of the above described engine, is much heavier than nitrogen, which is the main ingredient in the intake air of a conventional engine. Therefore, a smaller engine can handle the same mass of gas as a larger engine using air at the same pressure and temperature.

DESCRIPTION OF OPERATION

Figure 1:
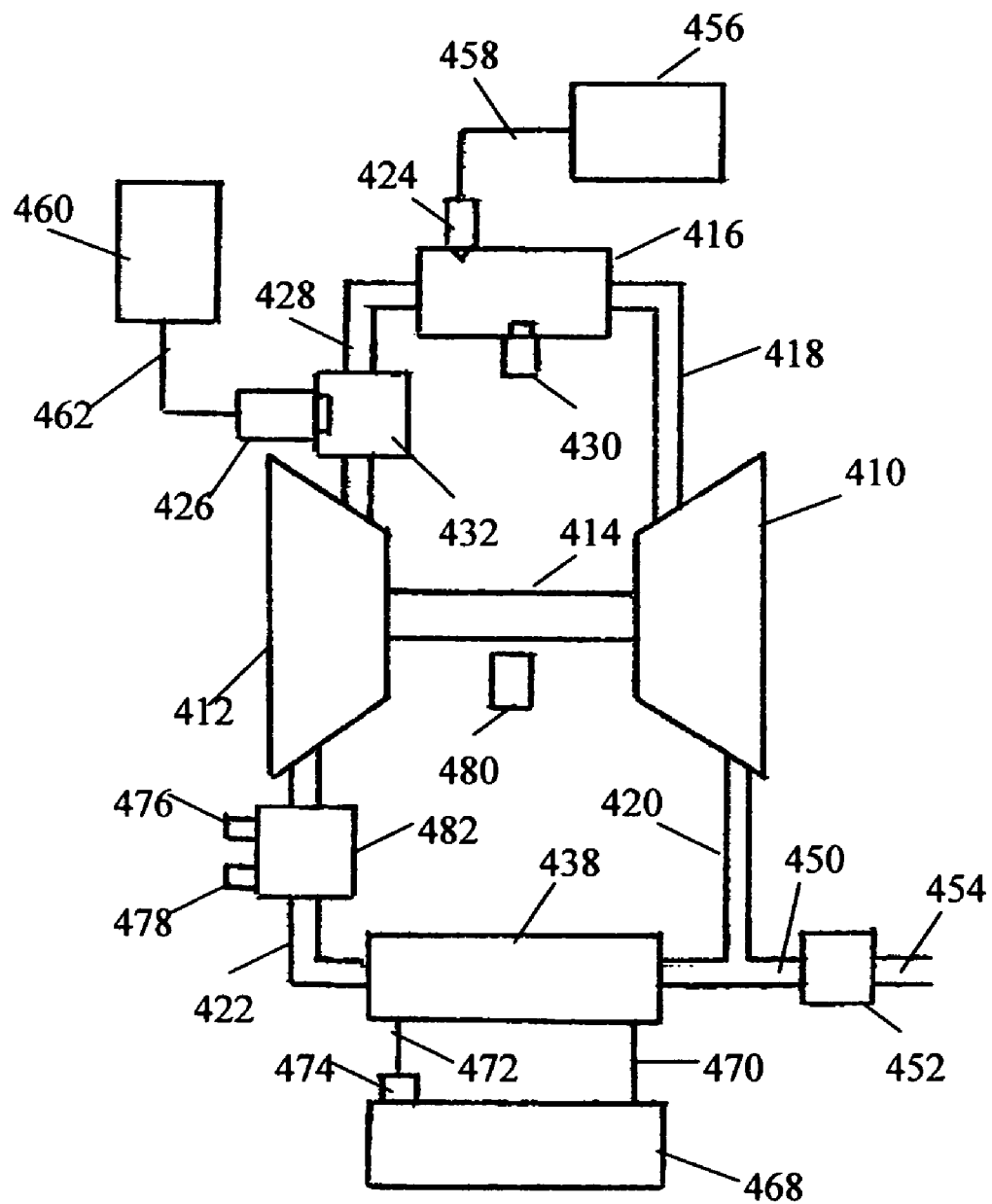
FIG. 1 is a schematic diagram of a gas turbine coupled to a compressor and connected to a combustor and to a combustion-gas cooler according to the present invention.
Figure 2:
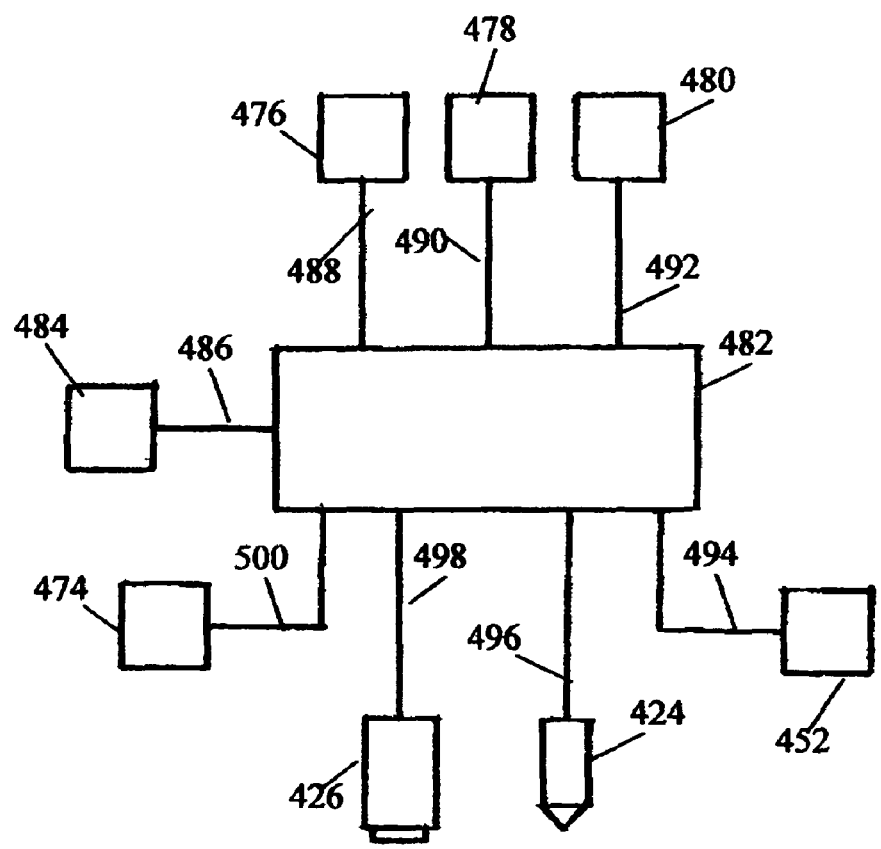
FIG. 2 is a schematic diagram illustrating a system of sensors sending input signals to the gas turbine control system, which sends out output signals to actuators controlling operation of various components of the turbine system.

A preferred embodiment of the present invention is illustrated in FIGS. 1 and 2. FIG. 1 is a schematic diagram of a gas turbine coupled to a compressor and connected to a combustor and to a combustion-gas cooler according to the present invention. The system also includes sources of fuel and oxygen.

A gas turbine 410 is coupled to a compressor 412 through a shaft 414. Shaft 414 can also be used to drive a device performing a useful function (not shown), such as a pump, an electric generator, etc. Gas turbine 410 is connected to a combustor 416 via an inlet pipe 418 and to a gas cooler 438 via an outlet pipe 420. Outlet pipe 420 is also connected, via a passage 450, to a pressure-control valve 452, from which an exhaust pipe 454 leads to outside atmosphere. Pressure-control valve 452 includes a controllably-variable restriction to the flow of gas into exhaust pipe 454. Compressor 412 is connected to gas cooler 438 via an inlet pipe 422 and compressor inlet chamber 482, and to combustor 416 via a compressor outlet chamber 432 and an outlet pipe 428. A fuel injector 424 and an igniter 430 are installed in combustor 416, and an oxygen injector 426 is installed in compressor outlet chamber 432. Fuel injector 424 is connected, via a fuel line 458, to a fuel supply system 456. Oxygen injector 426 is connected, via an oxygen-supply line 462, to an oxygen-supply system 460. Both liquid and gaseous oxygen can be used. Oxygen can be stored in an on-site container that is periodically refilled or recharged.

Inside gas cooler 438, a multitude of cooling pipes (not shown) carries cooling fluid. A heat-rejection system 468 receives cooling fluid from gas cooler 438, via a pipe 470 and, after heat rejection, pumps it back into gas cooler 438 via a control valve 474 and a pipe 472. Control valve 474 includes a controllable restriction that controls the flow of fluid from heat-rejection system 468 into gas cooler 438.

Temperature and pressure sensors 476 and 478, respectively, are mounted into compressor inlet chamber 482. They measure the temperature and the pressure of the gas inside the chamber. A speed sensor 480 mounted in the vicinity of shaft 414 measures the turbine speed.

FIG. 2 is a schematic diagram illustrating a system of sensors sending input signals to the gas turbine control system, which sends out output signals to actuators controlling operation of various components of the turbine system. The signals generated by the sensors inform the control system about turbine operator's demands for specific turbine power and speed, as the case may be. The input signals also carry information on physical and operational conditions in various parts and components of the system. The control system evaluates the received information and, in accordance with its internal logic, controls operation of the turbine system and its components, so as to satisfy the operator's demands while maintaining optimum fuel consumption efficiency and minimum exhaust emissions.

A control system 482 (FIG. 2) is an on-board computer programmed to control operation of various components of the turbine system in accordance with a strategy program incorporated into its software. The software contains algorithms and data that permit the control system to evaluate the stream of input signals and determine the magnitude and the timing of each output signal. The output signals control operation of the turbine system and its components and are updated at least once every engine cycle.

Control system 482 is connected to a control implement 484 via an electric wire 486. Control implement 484 is a device that permits the turbine operator to manually control the turbine operation by sending an appropriate control signal to the gas turbine control system specifying the operator's demand for a specific turbine power and speed. Control system 482 also receives input signals from temperature and pressure sensors 476 and 478, respectively, to which it is connected via electric wires 488 and 490, respectively. It also receives an input signal from engine speed sensor 480 via an electric wire 492. Output signals go out of control system 482 to pressure-control valve 452 via an electric wire 494, to fuel injector 424 via an electric wire 496, to oxygen injector 426 via an electric wire 498 and to control valve 474 via an electric wire 500.

Figure 3:
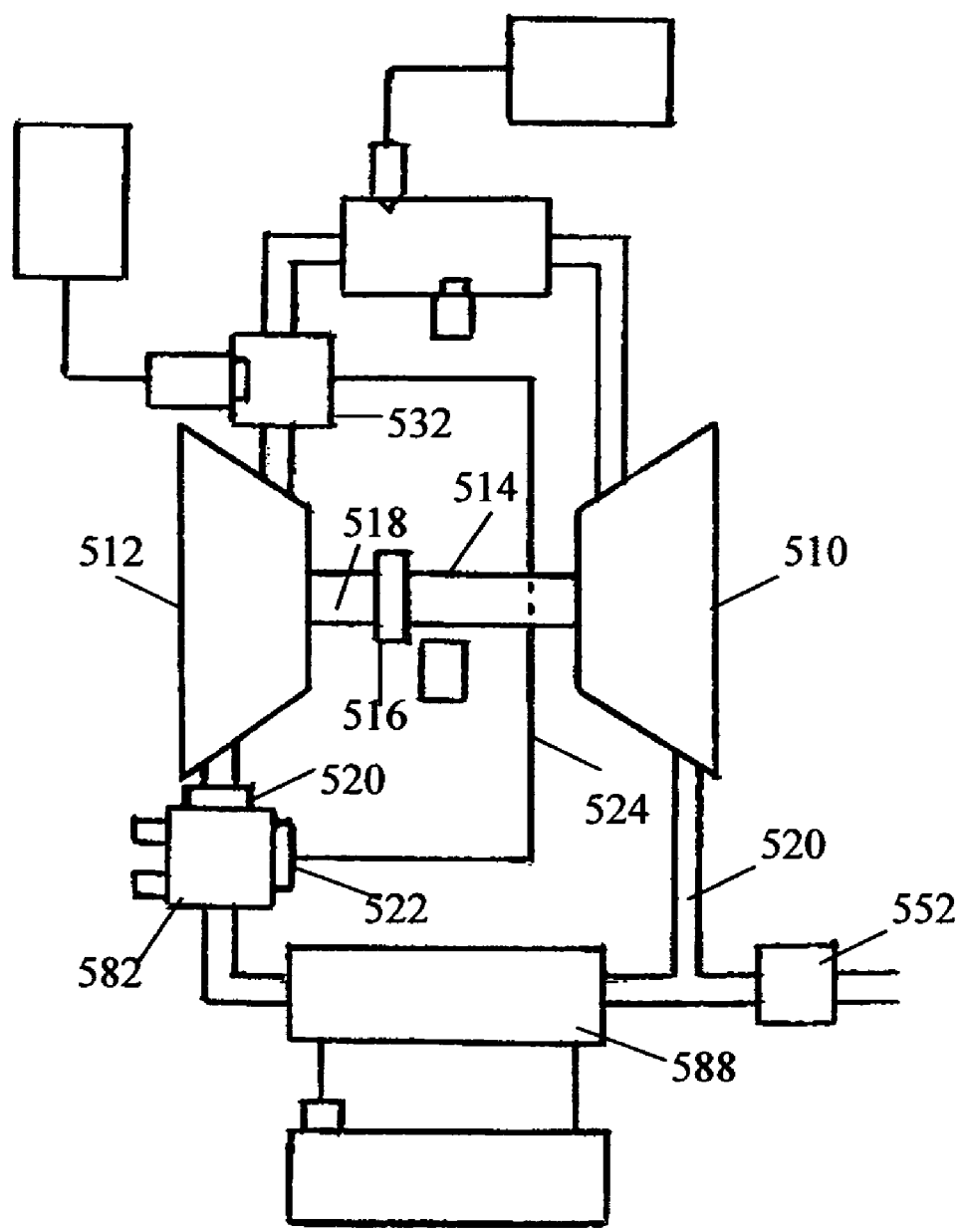
FIG. 3 is a schematic, diagram of another variant of a gas turbine system of the present invention, in which the flow of recycled combustion gas can bypass the compressor.

While FIG. 1 illustrates the basic design of the preferred embodiment, other variants of the basic design are possible. FIG. 3 is a schematic, diagram of another variant of a gas turbine system of the present invention, in which the flow of recycled combustion gas can bypass the compressor.

A gas turbine 510 (FIG. 3) can be connected to a compressor 512 through a shaft 514, a coupling 516 and a shaft 518. Coupling 516 is a connect/disconnect device, such as a clutch, which can selectively connect or disconnect shafts 514 and 518. Two valves, 520 and 522, are installed in a compressor inlet chamber 582, and a bypass pipe 524 connects valve 522 to a compressor outlet chamber 532. In all other respects, the above system is identical to the system illustrated in FIG. 1.

DESCRIPTION OF OPERATION

The gas-turbine system of the present invention receives no air from outside atmosphere. Instead, fuel and oxygen are added to combustion gas expelled from the turbine, which turns it into a combustible mixture that is burned in a combustor and recycled back to the turbine. A small amount of the expelled combustion gas is discharged into outside environment, and the rest is recycled. A more detailed description of the system operation is given below, with references to FIGS. 1-3.

Gas turbine 410 (FIG. 1) operates in a gas-recycling mode that requires no air induction from outside atmosphere. Oxygen and fuel are added to recycled combustion gas thus forming a combustible mixture that is burned in combustor 416 producing a very hot combustion gas that is used to power gas turbine 410. Gas exiting gas turbine 410 is cooler than gas entering the turbine, but it is still hot and needs cooling.

From gas turbine 410, most of the still hot combustion gas flows through outlet pipe 420 into gas cooler 438, while a smaller quantity of that gas is discharged through passage 450 and pressure-control valve 452 into exhaust pipe 454 leading to outside atmosphere. That smaller quantity of exhaust gas is equal to the mass of oxygen and fuel that was added to the recycled gas.

Inside gas cooler 438, hot combustion gas comes into contact with a multitude of cooling pipes (not shown) and looses a substantial portion of its heat to cooling fluid flowing inside the cooling pipes. Cooled combustion gas exits gas cooler 438 and flows into compressor 412.

Gas turbine 410 drives compressor 412 through shaft 414. Compressor 412 continuously inducts cooled combustion gas from gas cooler 438 via inlet pipe 422 and inlet chamber 482, compresses it and pumps it into combustor 416 via outlet chamber 432 and outlet pipe 428. Oxygen is injected through oxygen injector 426 into gas flowing through outlet chamber 432. Oxygen is supplied to oxygen injector 426 from oxygen-supply system 460 via oxygen-supply line 462. Fuel is injected through fuel injector 424 into combustor 416 thus feeding a continuous combustion inside the combustor. Igniter 430 is used only to initiate the combustion. Fuel is supplied to fuel injector 424 from fuel-supply system 456 via fuel-supply line 458.

Very hot combustion gas flows from combustor 416 through inlet pipe 418 into gas turbine 410, where it expands and performs mechanical work on the turbine blades causing the turbine to rotate.

Heat-rejection system 468 pumps cooling fluid through gas cooler 438. The cooling fluid absorbs heat from combustion gas in gas cooler 438 and rejects that heat to outside environment in heat-rejection system 468. Cooling fluid flows from heat-rejection system 468 through control valve 474 and pipe 472 into gas cooler 438. From there, it returns to heat-rejection system 468 via pipe 470. Operation of heat-rejection system 468 can be similar to operation of a conventional engine cooling system, which usually includes an air blower blowing atmospheric air through a radiator that carries the cooling fluid. In most cases, heat-rejection system 468 may be integrated with the rest of the engine cooling system.

Control of operation of the turbine system shown in FIG. 1 is illustrated in FIG. 2. Control system 482 is an on-board computer programmed to control operation of various components of the gas-turbine engine in accordance with a strategy program incorporated into its software. The software contains algorithms and data that permit the control system to evaluate the stream of input signals and determine the magnitude and the timing of each output signal. The output signals control operation of the gas-turbine system and its components and are frequently updated.

Control system 482 receives a control signal via electric wire 486 from control implement 484, which specifies the engine operator's demand for a specific turbine power and speed. The control system evaluates the received information and, in accordance with its internal logic, controls operation of the gas turbine and its components, so as to satisfy the operator's demands while maintaining optimum fuel consumption efficiency and minimum exhaust emissions. Control system 482 also receives input signals from temperature and pressure sensors 476 and 478, respectively, to which it is connected via electric wires 488 and 490, respectively. It also receives an input signal from speed sensor 480 via electric wire 492.

Control system 482 controls operation of gas turbine 410 (FIG. 1) by varying the quantity of fuel and oxygen injected into the recycled combustion gas. It also controls the pressure and temperature of the recycled combustion gas flowing back into compressor 412. The injected fuel quantity is controlled by sending a control signal to fuel injector 424 via electric wire 496. That signal controls the rate of fuel flow through the injector. The injected oxygen quantity is controlled by sending a control signal to oxygen injector 426 via electric wire 498. That signal controls the rate of oxygen flow. The temperature of gas flowing into compressor 412 (FIG. 1) is controlled by a signal sent to control valve 474 via electric wire 500. This controls the flow of cooling fluid through gas cooler 438 and varies the amount of heat absorbed from the gas by the cooling fluid. The pressure of gas flowing into gas cooler 438 (FIG. 1) is controlled by a signal sent to pressure-control valve 452 via electric wire 494 That varies the variable restriction incorporated into pressure-control valve 452 and controls the pressure drop across the restriction. This controls the pressure in outlet pipe 420 and gas cooler 438. It also indirectly controls pressure in outlet pipe 428 leading into combustor 416.

The gas turbine of the present invention can operate without a compressor, since it itself can produce the necessary gas pressure. This is illustrated in the variant of the system shown in FIG. 3. In the system shown in FIG. 3, gas turbine 510 can selectively operate with or without using compressor 512. If coupling 516 connects shafts 514 and 518, valve 520 is open and valve 522 is closed; compressor 512 is driven by gas turbine 510 and the recycled combustion gas flows through valve 520 and compressor 512. In that case, the system operates in the same way as the system previously described and illustrated in FIG. 1. If, however, coupling 516 disconnects shafts 514 and 518, valve 520 is closed and valve 522 is open, then compressor 512 stops working, and combustion gas bypasses the compressor. The gas flows from compressor inlet chamber 582, through valve 522 and bypass pipe 524 directly into compressor outlet chamber 532. Control system 482 (FIG. 2) determines when gas pressure produced by pressure control valve 552 is sufficient for compressor 512 to be deactivated and bypassed and takes appropriate action as dictated by its control program.

Increasing restriction to flow through pressure-control valve 552 (FIG. 3) increases pressure of combustion gas recycled back into gas cooler 538. There is less pressure blowdown from the turbine into outlet pipe 520, and more cooling is required in gas cooler 538 (FIG. 3), but the net result is a greater pressure and mass of gas flowing into gas turbine 510 (FIG. 3). There is no shortage of gas, since the mass of gas exiting gas turbine 510 is always greater than the mass of gas entering gas cooler 538. Thus the gas turbine of the present invention can be inherently self-supercharging. The quantity of injected fuel and oxygen can be adjusted independently of recycled gas control. Operating without the compressor improves the efficiency of the system.

CONCLUSION, RAMIFICATIONS AND SCOPE

The method and the system of the present invention apply to gas-turbine engines. Such application can substantially improve gas-turbine engine emissions, fuel economy and performance, while reducing the engine size.

Since no air is inducted into the engine, no nitrogen takes part in the combustion process. The combustion gas recycled back into the engine consists mostly of carbon dioxide and water vapor. Since no nitrogen is present, no nitrogen oxides are produced. This removes one of the most significant deficiencies of gas-turbine engines, which, in their conventional incarnations, are prodigious producers of nitrogen oxides.

Another drawback of gas turbines is particulate matter emission and this is greatly reduced too. Since most of the combustion gas is recycled back into the engine over-and-over again, an average particle of gas goes through the combustion process many times before it is discharged into outside environment. In such operation, most of the particulate matter is repeatedly returned to the combustor and is burned there. This removes the second major disadvantage of gas-turbine engines. The amount of other harmful exhaust emissions, such as unburned hydrocarbons and carbon monoxide, is greatly reduced too, since most of them are recycled back into the combustor and burned there.

The engine of the present invention can be considerably smaller than a conventional air-breathing engine with the same power capacity. This is because carbon dioxide, which is the main ingredient in the recycled combustion gas of the above described engine, is much heavier than nitrogen, which is the main ingredient in the intake air of a conventional engine. Therefore, a smaller engine can handle the same mass of gas as a larger engine using air at the same pressure and temperature.

The engine of the present invention can be a self-supercharging one, and it can operate without using a compressor for the recycled gas compression. Elimination of compressor work leads to a substantial improvement in fuel economy.

Complete elimination of nitrogen oxides coupled with a very substantial reduction in emission of particulate matter and other harmful pollutants, improvement in fuel economy and a reduction in engine size makes the system and the method of the present invention very attractive for gas-turbine engines and can broaden their application. Gas-turbine engines are smaller, lighter and have a better fuel economy than spark ignition engines. Increasing their acceptability in the market place can make a substantial contribution to reduced foreign oil import and to a reduction in harmful exhaust emission on a national scale.

Although the description above contains much specificity, this should not be construed as limiting the scope of the invention, but as merely providing illustrations of some of the presently preferred embodiments of this invention. For example, although the preferred arrangement illustrated in FIG. 1 anticipates direct injection of oxygen into the compressor outlet chamber, in other cases oxygen may be added to the recycled combustion gas before the gas enters the compressor or at other points in the system FIG. 3 illustrates a case, in which the flow of the recycled gas can bypass the compressor, and the compressor can be deactivated. In other cases, the compressor can be completely eliminated from the system. This leads to a substantial reduction in costs.

Description of the engine shown in FIG. 1 anticipates that oxygen is stored in an on-site container, which is periodically refilled or recharged. In some other cases, oxygen can be produced on-site out of atmospheric air by using one of the known methods of oxygen production, such as, for example, the method, in which the air is liquefied and then nitrogen is boiled off. This can produce 99.99% pure oxygen. Other methods of oxygen production can be used too.

Thus the scope of the invention should be determined by the appended claims and their legal equivalents, rather than by the examples given.

I claim:

1. A method for operating a gas-turbine engine, said method comprising the steps of:
   (a) providing a gas turbine that uses no air from outside atmosphere,
   (b) providing a gas-recycling means for recycling combustion gas from an outlet from said gas turbine to an inlet into said gas turbine,
   (c) providing a pressure-control means for controlling the pressure of recycled combustion gas and for discharging excess combustion gas into outside atmosphere,
   (d) providing a gas-cooling means for receiving, cooling and discharge of said combustion gas,
   (e) providing an oxygen-delivery means for adding oxygen to said combustion gas,
   (f) providing a fuel delivery means for adding fuel to said combustion gas,
   (g) providing a combustor,
   (h) providing a control means for controlling the operation of said gas-turbine engine in response to operator's demands and in accordance with a control program incorporated in said control means,
   (i) operating said gas-turbine engine in a gas-recycling mode by continuously performing a process that includes the steps of:
      (1) receiving hot combustion gas from said outlet from said gas turbine into said gas-cooling means,
      (2) cooling said hot combustion gas in said gas-cooling means, whereby said hot combustion gas turns into a cooled combustion gas,
      (3) adding oxygen to said cooled combustion gas and transferring said cooled combustion gas into said combustor,
      (4) adding fuel to said cooled combustion gas, whereby a combustible mixture forms,
      (5) burning said combustible mixture and producing very hot combustion gas in said combustor, wherein the temperature of said very hot combustion gas is higher than the temperature of said hot combustion gas,
      (6) transferring said very hot combustion gas from said combustor to said inlet into said gas turbine and using energy of said very hot combustion gas to operate said gas turbine, whereby said very hot combustion gas turns into hot combustion gas,
      (7) expelling said hot combustion gas from said gas turbine through said outlet from said gas turbine, and
      (8) discharging excess hot combustion gas into outside atmosphere, and
   (j) using said control means for control of operation of said gas-turbine engine,
   whereby said gas-turbine engine operates without receiving air from outside atmosphere,
   whereby said combustible mixture contains no nitrogen.
   whereby no nitrogen oxides are produced in said gas-turbine engine, and whereby harmful exhaust emissions are recycled back into said combustor and burned there.

2. The method of claim 1 wherein the mass of said excess combustion gas discharged into outside atmosphere is equal to the mass of oxygen and fuel added to said recycled combustion gas.

3. The method of claim 1 wherein:
   (a) said pressure-control means includes a controllably-variable restriction to the flow of said excess combustion gas, and
   (b) said control of operation of said gas-turbine engine includes controlling said controllably-variable restriction, whereby pressure of said hot combustion gas flowing into said gas-cooling means is controlled, whereby pressure of said cooled combustion gas flowing into said combustor is controlled, whereby the mass of said recycled combustion gas is controlled, and whereby said gas-recycling means is controllably supercharged.

4. The method of claim 1 wherein:
   (a) said gas-cooling means includes a flow of cooling fluid and a means for control of said gas-cooling means by controlling said flow of cooling fluid through said gas-cooling means, and
   (b) said control of operation of said gas-cooling means includes controlling said flow of cooling fluid, whereby temperature of said cooled combustion gas is controlled.

5. The method of claim 1 wherein said gas-recycling means includes a compressor means for facilitating transfer of said cooled combustion gas from said gas-cooling means into said combustor, said compressor means being driven by said gas turbine through a mechanical connection means.

6. The method of claim 5 wherein:
   (a) said mechanical connection means includes a means for selectively connecting and disconnecting said compressor means to and from said gas turbine,
   (b) said gas-recycling means includes a bypass means for selectively enabling said cooled combustion gas to bypass said compressor means, and
   (c) said control means disconnects said compressor means from said gas turbine and directs said cooled combustion gas to bypass said compressor means whenever said control program permits it, whereby efficiency of said gas-turbine engine is improved.

7. A system for operating a gas-turbine engine, said system comprising:
   (a) a gas turbine that uses no air from outside atmosphere,
   (b) a gas-recycling means for recycling combustion gas from an outlet from said gas turbine to an inlet into said gas turbine,
   (c) a pressure-control means for controlling the pressure of recycled combustion gas and for discharging excess combustion gas into outside atmosphere,
   (d) a gas-cooling means for receiving, cooling and discharge of said combustion gas,
   (e) an oxygen-delivery means for adding oxygen to said combustion gas,
   (f) a fuel delivery means for adding fuel to said combustion gas,
   (g) a combustor, and
   (h) a control means for controlling the operation of said gas turbine, said gas-cooling means and said pressure-control means in response to operator's demands and in accordance with a control program incorporated in said control means, said control program containing instructions for operating said gas turbine in a gas-recycling mode by continuously performing a process that includes the steps of
      (1) receiving hot combustion gas from said outlet from said gas turbine into said gas-cooling means,
      (2) cooling said hot combustion gas in said gas-cooling means, whereby said hot combustion gas turns into a cooled combustion gas,
      (3) adding oxygen to said cooled combustion gas and transferring it into said combustor,
      (4) adding fuel to said cooled combustion gas, whereby a combustible mixture forms,
      (5) burning said combustible mixture and producing very hot combustion gas in said combustor, wherein the temperature of said very hot combustion gas is higher than the temperature of said hot combustion gas,
      (6) transferring said very hot combustion gas from said combustor to said inlet into said gas turbine and using energy of said very hot combustion gas to operate said gas turbine, whereby said very hot combustion gas turns into hot combustion gas,
      (7) expelling said hot combustion gas from said gas turbine, and
      (8) discharging excess combustion gas into outside atmosphere, whereby said gas turbine operates without receiving air from outside atmosphere, whereby said combustible mixture contains no nitrogen.

whereby no nitrogen oxides are produced in said engine, and whereby harmful exhaust emissions are recycled back into said combustor and burned there.

* * * * *